(12) United States Patent
Jadhav et al.

(10) Patent No.: US 12,269,993 B2
(45) Date of Patent: Apr. 8, 2025

(54) SURFACTANT PACKAGE AND METHODS OF MAKING AND USING SAME

(71) Applicant: Halliburton Energy Services, Inc., Houston, TX (US)

(72) Inventors: Rahul Jadhav, Tananger (NO); Gunnar Lende, Tananger (NO)

(73) Assignee: Halliburton Energy Services, Inc., Houston, TX (US)

( * ) Notice: Subject to any disclaimer, the term of this patent is extended or adjusted under 35 U.S.C. 154(b) by 460 days.

(21) Appl. No.: 17/672,025

(22) Filed: Feb. 15, 2022

(65) Prior Publication Data

US 2023/0257643 A1 Aug. 17, 2023

(51) Int. Cl.
*C09K 8/584* (2006.01)
*C09K 23/00* (2022.01)

(52) U.S. Cl.
CPC ............ *C09K 8/584* (2013.01); *C09K 23/018* (2022.01)

(58) Field of Classification Search
CPC ........ C09K 8/584; C09K 23/018; C09K 8/40; C09K 8/035
See application file for complete search history.

(56) References Cited

U.S. PATENT DOCUMENTS

| | | | | |
|---|---|---|---|---|
| 6,534,449 B1* | 3/2003 | Gilmour | ................ | C09K 8/524 |
| | | | | 507/263 |
| 2014/0224492 A1* | 8/2014 | Weaver | .................... | C09K 8/68 |
| | | | | 166/305.1 |
| 2016/0090523 A1* | 3/2016 | Ravi | ....................... | E21B 33/14 |
| | | | | 507/262 |
| 2016/0264837 A1* | 9/2016 | Nelson | .................... | E21B 33/13 |
| 2018/0044569 A1* | 2/2018 | Yakovlev | ................ | C04B 28/04 |
| 2018/0265763 A1 | 9/2018 | Leotaud et al. | | |
| 2019/0292431 A1 | 9/2019 | AlBahrani et al. | | |

FOREIGN PATENT DOCUMENTS

CN 103045223 A 4/2013

OTHER PUBLICATIONS

Quintero, Lirio et al., "Efficient Displacement of Synthetic or Oil-based Mud and Transitional Phase Inversion," AIChE 2012 Spring Meeting, Advances drilling and completion session I, Apr. 1-5, 2012, 9 pages, AIChE.
Foreign Communication from Related Application—International Search Report and Written Opinion of the International Searching Authority, International Application No. PCT/US2022/052514, dated Apr. 17, 2023, 12 pages.

* cited by examiner

*Primary Examiner* — Kumar R Bhushan
(74) *Attorney, Agent, or Firm* — Conley Rose, P.C.; Rodney B. Carroll

(57) ABSTRACT

Disclosed herein is a surfactant package comprising a base oil, a mutual solvent, and a surfactant, wherein the surfactant is selected from the group consisting of alcohol ethoxylates, fatty alcohol ethoxylates, alkylphenol ethoxylates, nonoxynols, fatty acid esters of sorbitol, alkyl ether carboxylic acids, ethoxysulfates, and combinations thereof. Also disclosed herein is a wellbore servicing fluid comprising an aqueous fluid and the surfactant package. The wellbore servicing fluid can be used in a method of servicing a wellbore penetrating a subterranean formation. The wellbore servicing fluid has an increased mud removal percentage, is compatible with an OBM and a cementitious fluid, and has reduced environmental impacts. The surfactant package can be added into the wellbore servicing fluid as a single component, which can save storage space and preparation time of the wellbore servicing fluid, thus the surfactant package can be used at a location having limited equipment/tools/space (e.g., an offshore platform). The surfactant package is a homogeneous fluid, which facilitates storage and transportation, and saves preparation time of the wellbore servicing fluid.

20 Claims, 7 Drawing Sheets

SURFACTANT PACKAGE AND METHODS OF MAKING AND USING SAME

FIELD

This application relates to a composition, and more specifically this application relates to a surfactant package that can be used in the recovery of natural resources from a wellbore penetrating a subterranean formation.

BACKGROUND

This disclosure relates generally to a composition. More specifically, it relates to a surfactant package and methods of making and using same for treating a wellbore penetrating a subterranean formation, for example treating the wellbore with a wellbore servicing fluid (e.g., a spacer fluid) including the surfactant package before cementing operations.

Hydrocarbons, such as oil and gas, residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. Drilling may be halted and a string of casing is run into the wellbore, where residual drilling fluid may fill a volume provided by the interior of the casing string and/or an annular space provided between the exterior of the casing string and the interior wall of the wellbore. A spacer fluid is usually placed in the wellbore to physically separate the residual drilling fluid from a cementitious fluid being placed downhole after the spacer fluid. A cementitious fluid is typically prepared by mixing cement, water, and assorted dry and liquid additives. The cementitious fluid is placed into the wellbore downward through the interior of the casing string and upward through the annulus wherein the cement is allowed to set into a hard mass (i.e., sheath) to thereby attach the casing string to the walls of the wellbore and seal the annulus. A cementitious fluid can also be used to seal formations to prevent loss of drilling fluid (e.g., in squeeze cementing operations) and for operations ranging from setting kick-off plugs to plug and abandonment of a wellbore. The spacer fluid has to be compatible with the two fluids being separated, e.g., the drilling fluid and the cementitious fluid. In some instances, synthetic or oil-based muds (S/OBM) are used as a drilling fluid and make surfaces in a wellbore oil-wet. It is desirable to use a composition before a cementing operation to remove the S/OBM and leave the surfaces in the wellbore water-wet, thus facilitating bonding with the cementitious fluid.

Additionally, offshore oil and gas production is usually more challenging than land-based onshore oil and gas production due to remote and harsher environment. Offshore platforms may have constraints for equipment/tools due to offshore conditions (e.g., limited space, motion) and may need special equipment/tools, compared to an onshore wellbore. Moreover, offshore drilling, completion, workover, and production operations present more environmental challenges than those operations onshore, from the produced hydrocarbons and the materials used during the operations. In some areas (such as the North Sea), the materials used during the operations have to be compliant with certain regulations to reduce environmental impact.

Therefore, an ongoing need exists for a composition that can be included in a wellbore servicing fluid (e.g., a spacer fluid) to obtain displacement and film removal of S/OBM, and be used at a location having limited equipment/tools/space (e.g., an offshore platform), while reducing environmental impacts.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
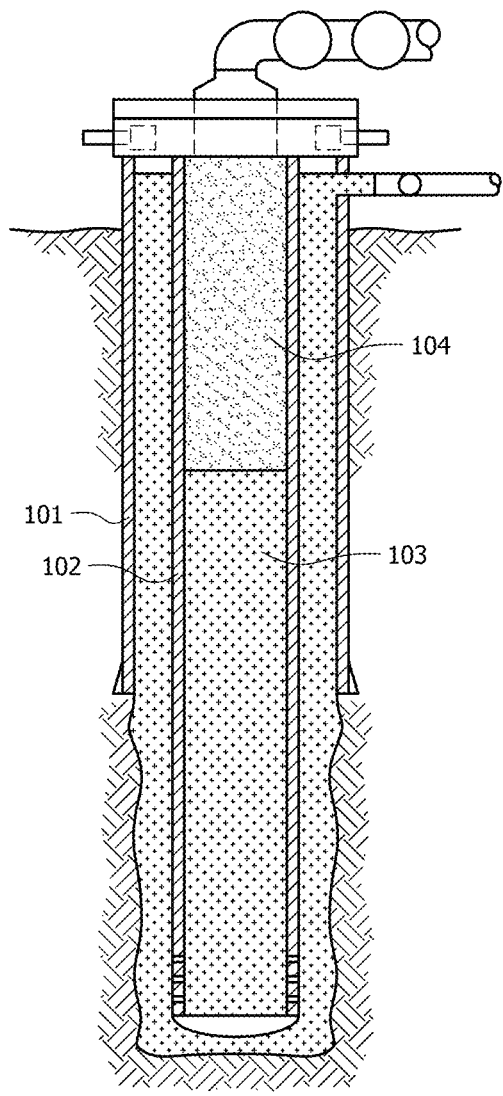
FIGS. 1A and 1B are cross-sectional, side views of a wellbore penetrating a subterranean formation, with a conduit disposed therein.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a surfactant package. The surfactant package can comprise a base oil, a mutual solvent, and a surfactant. The surfactant package can be included in a wellbore servicing fluid such as a spacer fluid. In some embodiments, a wellbore penetrating a subterranean formation is treated with synthetic or oil-based mud (S/OBM), which can form a film of oil on surfaces in the wellbore (e.g., surfaces of the subterranean formation and/or casing) making the surfaces oil-wet. Generally, after a drilling operation, it may be desirable to return the subterranean formation to a water-wet condition where a film of water coats the surfaces in the wellbore. A water-wet condition allows for more efficient cement bonding and hydrocarbon transport than an oil-wet surface.

In some embodiments, the surfactant package comprises at least one surfactant. The at least one surfactant can be selected from the group consisting of alcohol ethoxylates, fatty alcohol ethoxylates, alkylphenol ethoxylates, nonoxynols, fatty acid esters of sorbitol, alkyl ether carboxylic acids, ethoxysulfates, and combinations thereof. Alcohol ethoxylates are a class of surfactants that contain a hydrophobic alkyl chain attached via an ether linkage to a hydrophilic ethylene oxide (EO) chain. Fatty alcohol ethoxylates can be generated by performing ethoxylation upon fatty alcohols, wherein the fatty alcohols can include from about 3 carbons to about 30 carbons and can be derived from natural fats and oils. Alkylphenol ethoxylates are surfactants consisting of branched-chain alkylphenols (e.g., octylphenol and nonylphenol), which have been reacted with ethylene oxide, producing an ethoxylate chain. Nonoxynols are a family of surfactants, which can be produced by ethoxylation of alkylphenols and vary in the number of repeating ethoxy (oxy-1,2-ethanediyl) groups resulting in nonoxynol-4, nonoxynol-7, nonoxynol-9, nonoxynol-14, nonoxynol-15, nonoxynol-18, etc. Fatty acid esters of sorbitol (or referred to as sorbitol fatty acid esters) can be obtained from reactions between sorbitol, sorbitol monoanhydride, and sorbitol dianhydride with saturated and/or unsaturated fatty acids of different chain lengths.

In some embodiments, the at least one surfactant is selected from the group consisting of a first surfactant generally characterized by Structure I, a second surfactant generally characterized by Structure II, a third surfactant generally characterized by Structure III, and a combination thereof:

  Structure I:

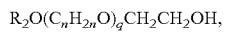  Structure II:

  Structure III:

In embodiments, x, n, and y of Structure I, Structure II and Structure III, respectively, are each independently from about 2 to about 4. In embodiments, p, q, and r of Structure I, Structure II and Structure III, respectively, are each independently from about 1 to about 40, alternatively from about 1 to about 30, alternatively from about 2 to about 20, or alternatively from about 2 to about 10. In some embodiments, p of Structure I, q of Structure II, and r of Structure III, respectively, are each independently from about 2 to about 5. In some embodiments, x, n, and y of Structure I, Structure 2, and Structure 3, respectively, are 2. In some embodiments, p of Structure I is 3, q of Structure II is 2, and r of Structure III is 3. $R_1$, $R_2$, and $R_3$ can each independently be a straight-chain or branched $(C_4-C_{20})$alkyl or alkylphenol. In some embodiments, $R_1$, $R_2$ and $R_3$ are each independently a straight-chain $(C_4-C_{14})$alkyl. In some embodiments, at least one of $R_1$, $R_2$, and $R_3$ includes even carbon numbers. In some embodiments, $R_1$, $R_2$, and $R_3$ are each independently a straight-chain $(C_6-C_{12})$alkyl. In some embodiments, x, n, and y of Structure I, Structure 2, and Structure 3, respectively, are 2; p, q, and r of Structure I, Structure II, and Structure III, respectively, are 3; and $R_1$, $R_2$, and $R_3$ are each independently a straight-chain $(C_6-C_{12})$alkyl.

In embodiments, $X^+$ of Structure I and $Y^+$ of Structure III are each independently hydrogen or a cation such as a sodium ion, an ammonium ion, and a potassium ion. In some embodiments, the first surfactant of Structure I comprises carboxylic acid functional group, a monoisopropanolamine salt, an amine salt, a sodium salt, an ammonium salt, a potassium salt, or a combination thereof. In some embodiments, the third surfactant of Structure III comprises a sulfate functional group, a monoisopropanolamine salt, an amine salt, a sodium salt, an ammonium salt, a potassium salt, or a combination thereof. In some embodiments, the first surfactant of Structure I comprises a monoisopropanolamine salt, wherein $X^+$ comprises:

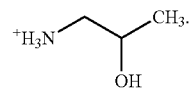

In some embodiments, the third surfactant of Structure III comprises a monoisopropanolamine salt, wherein $Y^+$ comprises:

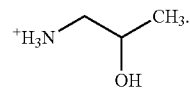

The surfactant can be present in the surfactant package in a total amount of from about 1 vol. % to about 99 vol. % based on the total volume of the surfactant package, alternatively from about 5 vol. % to about 70 vol. %, alternatively from about 10 vol. % to about 60 vol. %, alternatively from about 10 vol. % to about 50 vol. %, or alternatively from about 10 vol. % to about 40 vol. %.

In some embodiments, the surfactant package comprises a base oil. The base oil can comprise alkanes, hydrocarbons, olefins, polyolefins or isomerized polyolefins, glycerides of fatty acids, aliphatic esters, aliphatic ethers, aliphatic acetals, alkynes, aromatics, tall oil, crude oil, light cycle oil, synthetic ester oil, diesel, cycloalkane, petroleum distillate, liquefied petroleum gas, kerosene, gas oil, fuel oil, paraffin oil, synthetic paraffin oil, mineral oil, refined oil, low-toxicity mineral oil, ester, amide, synthetic oil, polydiorganosiloxane, siloxane, organosiloxane, ether, dialkylcarbonate, vegetable oil, biodiesel, renewable diesel, and combinations thereof. In some embodiments, the base oil comprises alkanes. In such embodiments, the base oil comprises $C_{10}-C_{20}$ linear alkanes.

In some embodiments, the base oil is present in the surfactant package in an amount of from about 1 vol. % to about 99 vol. %, based on the total volume of the surfactant package, alternatively from about 10 vol. % to about 90 vol.

%, alternatively from about 15 vol. % to about 80 vol. %, or alternatively from about 20 vol. % to about 70 vol. %.

In some embodiments, the surfactant package comprises a mutual solvent. Herein a mutual solvent is defined as a material that is soluble in oil, water, and acid-based treatment fluids. Given that the mutual solvent is miscible with more than one class of liquids, such materials may also be referred to as coupling agents because such materials can cause two ordinarily immiscible liquids to combine with each other. Exemplary mutual solvents include, but are not limited to, alcohols, ethers such as ethyleneglycolmonobutyl ether and diethylene glycol monomethyl ether, alcohol ethers, aromatic solvents, and other hydrocarbons.

In some embodiments, the mutual solvent comprises monethylene glycol, diethylene glycol, ethylene glycol monobutyl ether, diethylene glycol monobutyl ether, polyethylene glycol butyl ether, glycol-ethers, propylene glycol, glycols, hexanol, 1,2-propane diol, diols, glycerol, glycerine, triols, polyols, straight-chain or branched $C_3$-$C_{12}$ alcohols, N-methyl-2-pyrrolidone, dimethylsulfoxide, dimethylformamide, tetrahydrofuran, acetone, $C_3$-$C_{10}$ ketone, $C_2$-$C_{10}$ ester, $C_2$-$C_{10}$ ether, $C_3$-$C_{10}$ cyclic ether, other hydrocarbons, or a combination thereof. In some embodiments, the mutual solvent comprises ethylene glycol monobutyl ether, hexanol, or a combination thereof. Commercial examples of suitable mutual solvents suitable for use in the present disclosure include, but are not limited to, MUSOL® mutual solvent, MUSOL® A mutual solvent, MUSOL® E mutual solvent, which are commercially available from Halliburton Energy Services, Inc.

The mutual solvent can comprise a polar solvent. A polar solvent can include a compound whose electrons are not shared equally in chemical bonds.

The mutual solvent can be present in the surfactant package in an amount of from about 1 vol. % to about 99 vol. % based on the total volume of the surfactant package, alternatively from about 10 vol. % to about 85 vol. %, alternatively from about 10 vol. % to about 70 vol. %, or alternatively from about 10 vol. % to about 55 vol. %.

In some embodiments, the surfactant package has a mud removal percentage of equal to or greater than about 95% in a well cleaning test with an oil-based mud (OBM). In such embodiments, the surfactant package is present in an amount of from about 0.05 gallon per barrel (gal/bbl) to about 10 gal/bbl in water, alternatively from about 0.5 gal/bbl to about 8 gal/bbl, alternatively from about 0.5 gal/bbl to about 4 gal/bbl, alternatively from about 0.5 gal/bbl to about 3 gal/bbl, or alternatively from about 1 gal/bbl to about 3 gal/bbl in water. Alternatively, the mud removal percentage is equal to or greater than about 95%, alternatively equal to or greater than about 96%, alternatively equal to or greater than about 98%, alternatively equal to or greater than about 99%, or alternatively from about 95% to about 100%. A well cleaning test is also referred as a sleeve test or a mud removal test. In a well cleaning test, a clean sleeve (e.g., a stainless-steel sleeve) is coated with an OBM, rotated in a mixture of the surfactant package and water for about 10 minutes, and dried for about 5 minutes. The weights of the clean sleeve, the OBM-coated sleeve, and the sleeve after drying are then measured, and the percentage of OBM that is removed by the mixture, also referred to as mud removal percentage is calculated. Details of the well cleaning test are described in the Examples section.

The surfactant package can be in the form of a liquid. In some embodiments, the components of the surfactant package are miscible, in other words, the surfactant package is a homogeneous fluid (e.g., a single-phase solution). In other embodiments, the surfactant package includes a second phase (e.g., a second liquid phase) in an amount of equal to or less than about 95 vol. % based on the total volume of the surfactant package, alternatively equal to or less than about 50 vol. %, or alternatively equal to or less than about 10 vol. %.

In some embodiments, the surfactant package is characterized as meeting the requirements to be deemed North Sea compliant. Herein the surfactant package being deemed "North Sea compliant" refers to the formulation generally meeting the standards set by the Norwegian Environment Agency for use in oil and gas recovery operations occurring in its jurisdictions such as the North Sea.

The surfactant package disclosed herein can have any suitable density, including, but not limited to, a density in a range of from about 4 pounds per gallon (lb/gal, ppg) to about 25 ppg, alternatively from about 5 ppg to about 20 ppg, alternatively from about 6 ppg to about 15 ppg, or alternatively from about 7 ppg to about 10 ppg.

A surfactant package of the type disclosed herein can be prepared using any suitable method, such as batch mixing or continuous mixing. In one or more embodiments, the method comprises mixing components (e.g., the base oil, the mutual solvent, and the surfactant) of the surfactant package using mixing equipment (e.g., a jet mixer, re-circulating mixer, a batch mixer, a blender, a mixing head of a solid feeding system) to form a fluid (e.g., a homogeneous fluid). For example, all components of the surfactant package may be added to a batch mixer and agitated until the desired amount of mixing is achieved. Alternatively, the surfactant package may be added to a continuous mixer where components are metered in and a product of the surfactant package is continuously withdrawn. The prepared surfactant package may be transported and stored at a well site.

Also disclosed herein is a wellbore servicing fluid (e.g., a spacer fluid) comprising the surfactant package and an aqueous fluid. A spacer fluid can physically separate two or more fluids in a wellbore. The surfactant package can be present in the wellbore servicing fluid in an amount of from about 0.1 vol. % to about 25 vol. %, based on the total volume of the wellbore servicing fluid, alternatively from about 1 vol. % to about 20 vol. %, alternatively from about 1 vol. % to about 15 vol. %, alternatively from about 1 vol. % to about 10 vol. %, or alternatively from about 1 vol. % to about 5 vol. %.

Also disclosed herein is a wellbore servicing fluid (e.g., a spacer fluid) comprising the base oil, the mutual solvent, the surfactant, and the aqueous fluid. The base oil can be in an amount of from about 0.1 vol. % to about 99 vol. % based on the total volume of the wellbore servicing fluid, alternatively from about 10 vol. % to about 90 vol. %, alternatively from about 15 vol. % to about 80 vol. %, or alternatively from about 20 vol. % to about 70 vol. %. The mutual solvent can be in an amount of from about 0.1 vol. % to about 99 vol. % based on the total volume of the wellbore servicing fluid, alternatively from about 10 vol. % to about 85 vol. %, alternatively from about 10 vol. % to about 70 vol. %, or alternatively from about 10 vol. % to about 55 vol. %. The surfactant can be in an amount of from about 0.1 vol. % to about 99 vol. % based on the total volume of the wellbore servicing fluid, alternatively from about 5 vol. % to about 70 vol. %, alternatively from about 10 vol. % to about 60 vol. %, or alternatively from about 10 vol. % to about 40 vol. %. One of ordinary skill in the art can recognize that wellbore servicing fluid comprising the surfactant package and the aqueous fluid can be the same as the wellbore servicing fluid comprising the base oil, the mutual solvent, the surfactant, and the aqueous fluid.

The wellbore servicing fluid can include an aqueous fluid. Generally, the aqueous fluid may be from any source, provided that it does not contain an amount of components that may undesirably affect the other components (e.g., the components of the surfactant package) in the wellbore servicing fluid. For example, the aqueous fluid can comprise fresh water, surface water, ground water, produced water, salt water, sea water, brine (e.g., underground natural brine, formulated brine, etc.), or a combination thereof. In some embodiments, the aqueous fluid includes a brine. In one or more embodiments, the brine includes monovalent or divalent salts such as, sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, or a combination thereof. A formulated brine may be produced by dissolving one or more soluble salts in water, a natural brine, or sea water. The brine can be saturated or unsaturated.

The aqueous fluid can be present in the wellbore servicing fluid in an amount effective to provide a pumpable slurry, such as a slurry having desired (e.g., job or service specific) rheological properties. In embodiments, the aqueous fluid is present in the wellbore servicing fluid in an amount of from about 1 vol. % to about 99.9 vol. % based on the total volume of the wellbore servicing fluid, alternatively from about 10 vol. % to about 99 vol. %, or alternatively from about 25 vol. % to about 95 vol. %.

In embodiments, the wellbore servicing fluid further includes one or more additives. The one or more additives can include a viscosifier, a rate of penetration enhancer, spotting fluid, a sweeping agent, a deflocculant, a degreaser, a pH buffer, a wetting agent, a lubricant, a shale inhibitor, a friction reducer, a strength-stabilizing agent, an emulsifier, an expansion agent, a salt, a fluid loss agent, a vitrified shale, a thixotropic agent, a dispersing agent, a weight reducing additive (e.g., hollow glass or ceramic beads), a heavy-weight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, superabsorbers, mechanical property modifying additives (i.e. carbon fibers, glass fibers, metal fibers, minerals fibers, polymeric elastomers, latexes, etc.), inert particulates, a biopolymer, a polymer, a fume silica, a free fluid control additive, particulate materials, acids, bases, corrosion inhibitors, conventional breaking agents, relative permeability modifiers, lime, clay control agents, fluid loss control additives, flocculants, water softeners, foaming agents, oxidation inhibitors, thinners, scavengers, lubricants, bridging agents, a foam stabilizer, catalysts, dispersants, breakers, emulsion thinner, emulsion thickener, pH control additive, lost circulation additives, calcium carbonate, walnut particles, graphite, caulk, buffers, stabilizers, chelating agents, oxidizers, a clay, reducers, consolidating agents, complexing agents, sequestration agents, an oxidative breaker, and the like, or combinations thereof. The oxidative breaker can include bromate, persulfate, perborate, and perbromate, for example. With the benefit of this disclosure, one of ordinary skill in the art should be able to recognize and select one or more suitable additives for use in the wellbore servicing fluid.

In embodiments, the one or more additives are present in the wellbore servicing fluid in an amount of from about 0.001 wt. % to about 85 wt. %, based on the total weight of the wellbore servicing fluid, alternatively from about 0.1 wt. % to about 80 wt. %, or alternatively from about 1 wt. % to about 50 wt. %.

The wellbore servicing fluid disclosed herein can have any suitable density. In some embodiments, the density of the wellbore servicing fluid ranges from about 4 lb/gal (ppg) to about 25 ppg, alternatively from about 7 ppg to about 20 ppg, alternatively from about 10 ppg to about 20 ppg, or alternatively from about 12 ppg to about 18 ppg.

In some embodiments, the wellbore servicing fluid is compatible with an OBM. Being compatible with an OBM is defined herein as: in accordance with compatibility test standard in API-RP-10B-2, wherein a mixture of the wellbore servicing fluid and an OBM at various mixing ratios has an increase or a decrease in rheology reading compared to the wellbore servicing fluid or the OBM at the same rpm of equal to or less than about 100%, alternatively equal to or less than about 70%, or alternatively equal to or less than about 50%. The compatibility test can be performed in a temperature range of from about 68° F. to about 194° F. at atmospheric pressure employing a speed of from about 3 rpm to about 300 rpm. The various mixing ratios of the wellbore servicing fluid to the OBM are from 0 vol. %:100 vol. % to 100 vol. %:0 vol %.

In some embodiments, the wellbore servicing fluid is compatible with a cementitious fluid. Being compatible with a cementitious fluid is defined herein as: in accordance with compatibility test standard in API-RP-10B-2, wherein a mixture of the wellbore servicing fluid and a cementitious fluid at various mixing ratios has an increase or a decrease in rheology reading compared to the wellbore servicing fluid or the cementitious fluid at the same rpm of equal to or less than about 100%, alternatively equal to or less than about 70%, or alternatively equal to or less than about 50%. The compatibility test can be performed in a temperature of from about 50° F. to about 194° F. at atmospheric pressure employing a speed of from about 3 rpm to about 300 rpm. The various mixing ratios of the wellbore servicing fluid to the cementitious fluid are from 0 vol. %:100 vol. % to 100 vol. %:0 vol %.

In some embodiments, an OBM-spacer mixture of an OBM and the wellbore servicing fluid comprising the surfactant package is a water-external phase emulsion in a spacer surfactant screening test (SSST) in accordance with test standard API-RP-10B-2. In such embodiments, the wellbore servicing fluid is in an amount of from about 10 vol. % to about 99 vol. %, based on the total volume of the OBM-spacer mixture, alternatively from about 30 vol. % to about 99 vol. %, alternatively from about 50 vol. % to about 99 vol. %, or alternatively from about 60 vol. % to about 99 vol. %. A water-external phase emulsion is also referred to as a direct emulsion fluid or an oil-in-water emulsion. A characteristic of a water-external phase emulsion may be that the aqueous phase of the emulsion is the external phase or the continuous phase while the oil phase is the internal phase or the dispersed phase.

In embodiments, a cement-spacer mixture of a cementitious fluid and the wellbore servicing fluid comprising the surfactant package has a thickening time. The thickening time herein refers to the time required for the cement-spacer mixture to achieve 50 Bearden units of Consistency (Bc)

after preparation of the cement-spacer mixture. At about 50 Bc, the cement-spacer mixture undergoes a conversion from a pumpable fluid state to a non-pumpable gel. In order to keep the cement-spacer mixture in a pumpable state for an appropriate amount of time, additives such as retarders and accelerators can be added to modulate the pump time by shortening or extending the thickening time. A measurement of Bc can be considered a thickening time test which is performed on a moving fluid. In a thickening time test, an apparatus including a pressurized consistometer can apply temperature and pressure to a slurry (e.g., a cement-spacer mixture) while the slurry is being stirred by a paddle. A resistor arm and potentiometer coupled to the paddle can provide an output in units of Bc. Thickening time can be measured in accordance with test standard API-RP-10B-2.

In embodiments, at from about 150° F. to about 250° F., a cement-spacer mixture of a cementitious fluid and the wellbore servicing fluid comprising the surfactant package has a thickening time to about 50 Bc ranging from about 60% to about 200% of the thickening time of the cementitious fluid alone, alternatively the range is from about 70% to about 180%, or alternatively from about 80% to about 160%. The wellbore servicing fluid can be present in the cement-spacer mixture in an amount of equal to or less than about 30 vol. % based on the total volume of the cement-spacer mixture.

Compressive strength is generally the capacity of a material or structure to withstand axially directed compression forces. The compressive strength of a composition can be measured at a specified time (e.g., 24 hours) after a cement blend has been mixed with water and the resultant cement slurry is maintained under specified temperature and pressure conditions to form a hardened, set cement. For example, compressive strength can be measured at a time in the range of from about 12 to about 48 hours (or longer) after the cement slurry is mixed, and the cement slurry is maintained typically at a temperature of from 0° C./32° F. to about 204° C./400° F. and a suitable pressure, during which time the cement slurry can set into a hardened mass. Compressive strength can be measured by either a destructive method or non-destructive method. The destructive method physically tests the strength of hardened samples at various points in time by crushing the samples in a compression-testing machine. The compressive strength is calculated from the failure load divided by the cross-sectional area resisting the load and is reported in units of pound-force per square inch (psi). Non-destructive methods can employ an ultrasonic cement analyzer (UCA). A UCA can be available from Fann® Instrument Company, Houston, TX Compressive strengths can be determined in accordance with API RP 10B-2, *Recommended Practice for Testing Well Cements*, First Edition, July 2005. Sonic strength is a measure of compressive strength based on "transit time" of soundwaves through the cement. The sonic strength is an indicator of crush compressive strength and is often used to monitor compressive strength versus time.

A cement-spacer mixture of the type disclosed herein may have a compressive strength evaluated by noting the time for the mixture to reach 500 psi sonic strength (also referred to as "time to reach 500 psi") as measured in an ultrasonic cement analyzer (UCA) test in accordance with test standard API-RP-10B-2. The time to reach 500 psi under static conditions in a UCA can be used as an estimation of the wait on cement time of a composition. In some embodiments, a mixture of the type disclosed herein at temperatures ranging from about 150° F. to about 280° F., has a time to reach 500 psi sonic strength that is about 60% to about 200% of the time to reach 500 psi sonic strength of the cementitious fluid alone, alternatively in a range of from about 70% to about 180%, or alternatively from about 80% to about 160%. The wellbore servicing fluid can be present in the cement-spacer mixture in an amount of equal to or less than about 30 vol. % based on the total volume of the cement-spacer mixture.

A wellbore servicing fluid (e.g., a spacer fluid) of the type disclosed herein can be prepared using any suitable method, such as batch mixing or continuous mixing. In one or more embodiments, the method comprises mixing components (e.g., the aqueous fluid and the surfactant package) of the wellbore servicing fluid using mixing equipment (e.g., a jet mixer, re-circulating mixer, a batch mixer, a blender, a mixing head of a solid feeding system) to form a pumpable fluid. For example, all components of the wellbore servicing fluid may be added to a batch mixer and agitated until the desired amount of mixing is achieved. Alternatively, the wellbore servicing fluid may be added to a continuous mixer where components are metered in and a product of the wellbore servicing fluid is continuously withdrawn. The surfactant package can be added as a single component, which reduces storage space and the time of preparation of the wellbore servicing fluid. In other embodiments, the components of the surfactant package are added into the wellbore servicing fluid separately or in any combination.

Also disclosed herein is a method of servicing a wellbore penetrating a subterranean formation. The method can comprise placing a wellbore servicing fluid of the type disclosed herein into the wellbore.

The wellbore servicing fluid comprising the surfactant package can physically separate two or more fluids present in a wellbore, and referred to as a spacer fluid. For example, the spacer fluid can be placed into the wellbore to separate a drilling fluid from a cementitious fluid. When placing the spacer fluid into the wellbore, there can be a conduit inside the wellbore, and the method of servicing a wellbore penetrating a subterranean formation further comprises placing the wellbore servicing fluid down through the conduit and back up through an annular space between an outside wall of the conduit and a wall of the wellbore, or placing the wellbore servicing fluid down through an annular space between an outside wall of the conduit and a wall of the wellbore and back up through the conduit. The conduit can be casing. The wellbore servicing fluid can be placed between two fluids (the first fluid and the second fluid) contained or to be pumped within a wellbore. The wellbore servicing fluid can physically space the first fluid apart from the second fluid such that the first fluid and the second fluid do not comingle while being placed (e.g., pumped) into the wellbore. In embodiments, the wellbore servicing fluid can be used to space apart two fluids (e.g., drilling fluid/mud and a cementitious fluid) that are being flowed from the surface down through a conduit (e.g., casing) present in the wellbore, exiting the conduit and flowing back upward in the annular space between the outside conduit wall and interior face of the wellbore. In embodiments, the wellbore servicing fluid can be used to space apart two fluids (e.g., drilling fluid/mud and a cementitious fluid) that are being flowed from the surface down through the annular space between the outside conduit wall and interior face of the wellbore, exiting the annular space and flowing back upward through the inside of the conduit.

Disclosed herein is a method of servicing a wellbore with casing disposed therein to form annular space between the wellbore wall and an outer surface of the casing, wherein a first fluid is present in at least a portion of the annular space. The method can comprise placing a spacer fluid into at least a portion of the annular space and displacing at least a portion of the first fluid from the annular space, wherein the spacer fluid comprises a surfactant package of the type disclosed herein and an aqueous fluid; placing a cementitious fluid into at least a portion of the annular space and displacing at least a portion of the spacer fluid from the annular space. The first fluid can be a drilling fluid. The drilling fluid herein refers to any liquid and gaseous fluid and mixtures of fluids and solids used in the operations of drilling a borehole into the earth. The drilling fluid can be water based, non-water based (e.g., an OBM), and/or gaseous. In some embodiments, the first fluid is an OBM. The OBM can form films on surfaces (e.g., the wellbore wall and/or the outer surface of the casing) of the annular space. In embodiments, the method further comprises removing at least a portion of the OBM film from the surfaces of the annular space. The surfactant package in the spacer fluid can convert the surface of the annular space from oil-wet to water-wet, thereby increasing the cement bonding efficiency of the surfaces. The method as disclosed herein can further comprise allowing at least a portion of the cementitious fluid to set.

Figure 1B:
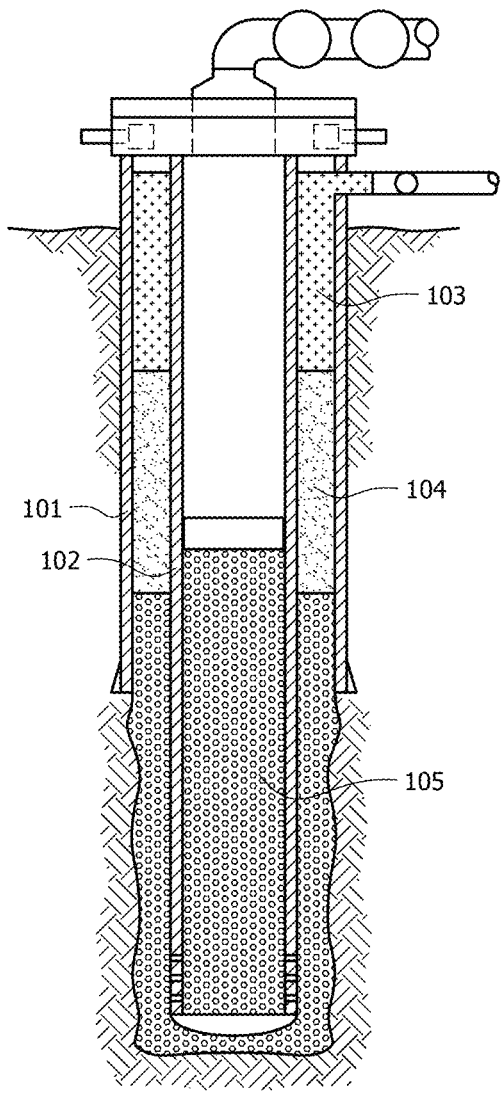

Disclosed herein is a method of servicing a wellbore 101 penetrating a subterranean formation as shown in FIGS. 1A and 1B, wherein the wellbore 101 has a conduit 102 disposed therein forming an annular space between an outer wall of the conduit 102 and an inner wall of the wellbore 101. The method can comprise pumping a first fluid 103 followed by a spacer fluid 104 followed by a second fluid 105 from the surface down an inner flow bore of the conduit 102, out an end of the conduit 102, and back up the annular space toward the surface, wherein the spacer fluid 104 comprises an aqueous fluid and a surfactant package. The surfactant package can comprise a base oil, a mutual solvent, and a surfactant selected from the group consisting of a first surfactant generally characterized by Structure I, a second surfactant generally characterized by Structure II, a third surfactant generally characterized by Structure III, and a combination thereof:

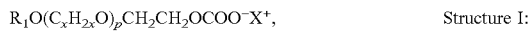

$$R_1O(C_xH_{2x}O)_pCH_2CH_2OCOO^-X^+,\qquad \text{Structure I:}$$

$$R_2O(C_nH_{2n}O)_qCH_2CH_2OH,\qquad \text{Structure II:}$$

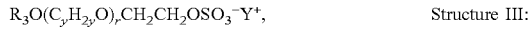

$$R_3O(C_yH_{2y}O)_rCH_2CH_2OSO_3^-Y^+,\qquad \text{Structure III:}$$

wherein x, n, and y are each independently from about 2 to about 4; wherein p, q, and r are each independently from about 1 to about 40; wherein $R_1$, $R_2$, and $R_3$ are each independently a straight-chain or branched ($C_4$-$C_{20}$)alkyl or alkylphenol; and wherein $X^+$ and $Y^+$ are each independently hydrogen or a cation. The conduit 102 can comprise casing, the first fluid 103 can be an OBM, and the second fluid 105 can be a cementitious fluid.

Figure 2A:
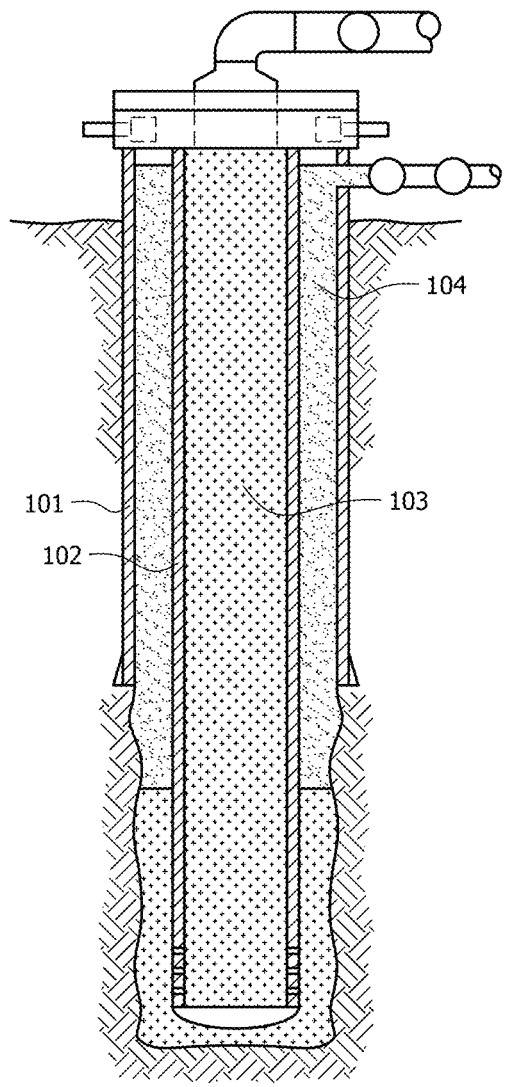
FIGS. 2A and 2B are cross-sectional, side views of a wellbore penetrating a subterranean formation, with a conduit disposed therein.
Figure 2B:
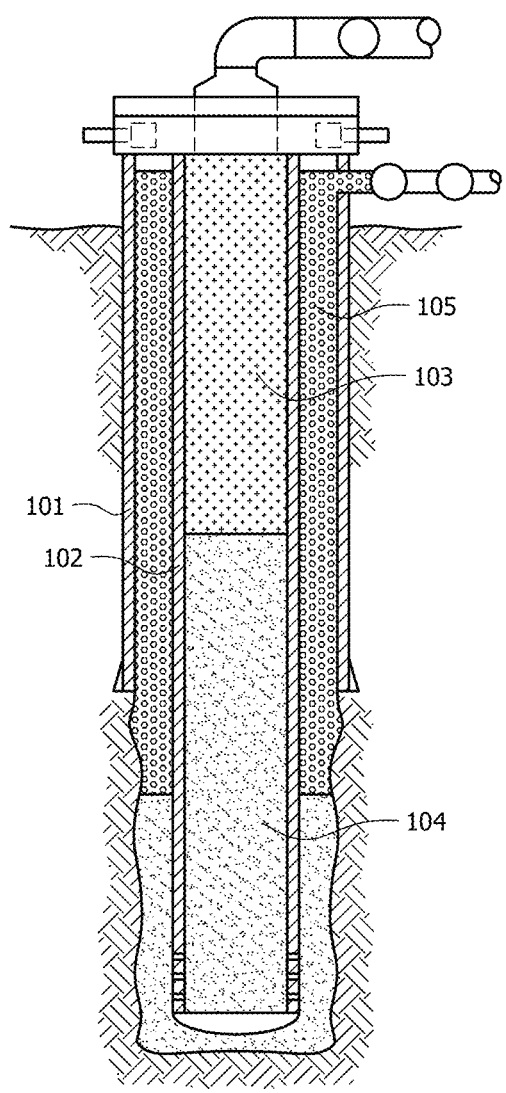
Figure 3A:
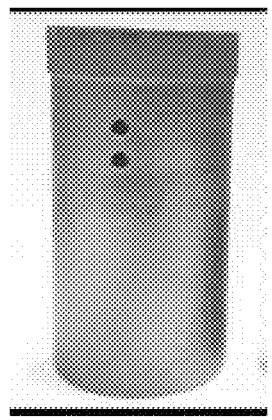
FIGS. 3A-3D are photos of sleeves in a well cleaning test in accordance with some embodiments of the disclosure.
Figure 3B:
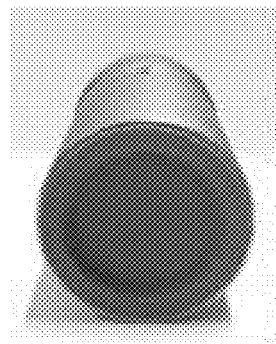
Figure 3C:
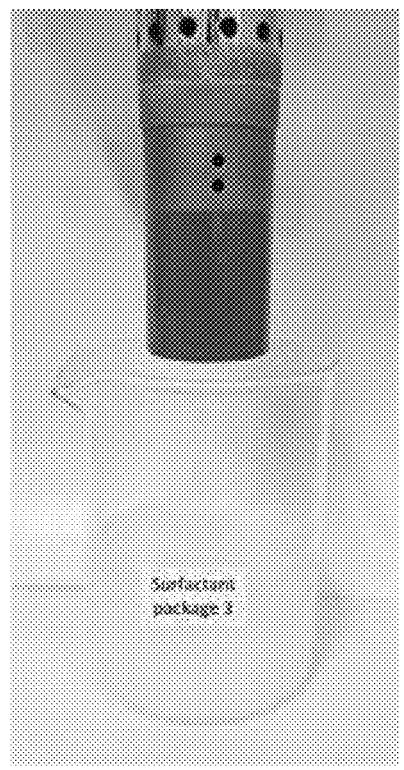
Figure 3D:
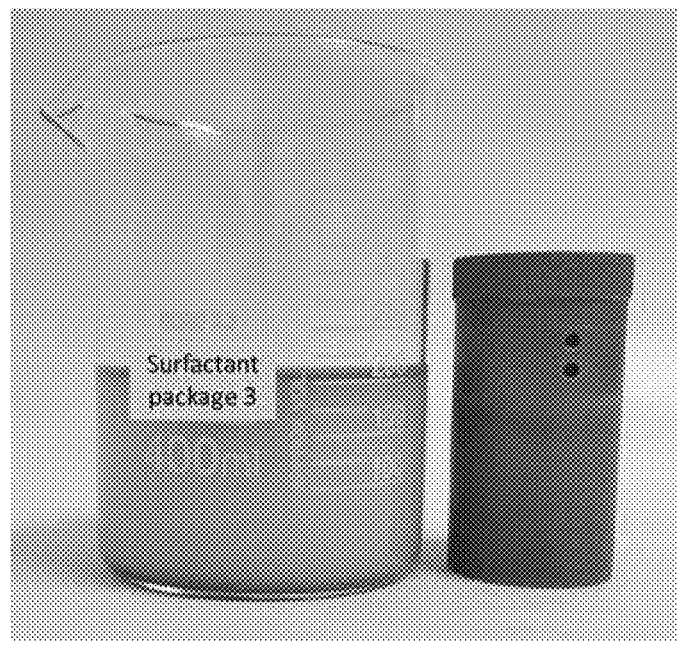

In embodiments, the direction of the flow of the first fluid, the spacer fluid, and the second fluid can reverse from that in the method disclosed above. Disclosed herein is a method of servicing a wellbore 101 penetrating a subterranean formation as shown in FIGS. 2A and 2B, wherein the wellbore 101 has a conduit 102 disposed therein forming an inner flow bore of the conduit 102 and an annular space between an outer wall of the conduit 102 and an inner wall of the wellbore 101. The method can comprise pumping a first fluid 103 followed by a spacer fluid 104 followed by a second fluid 105 from the surface down through the annular space, out an end of the annular space, and back up the inner flow bore toward the surface, wherein the spacer fluid 104 comprises an aqueous fluid and a surfactant package. The surfactant package can comprise a base oil, a mutual solvent, and a surfactant selected from the group consisting of a first surfactant generally characterized by Structure I, a second surfactant generally characterized by Structure II, a third surfactant generally characterized by Structure III, and a combination thereof:

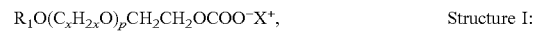

$$R_1O(C_xH_{2x}O)_pCH_2CH_2OCOO^-X^+,\qquad \text{Structure I:}$$

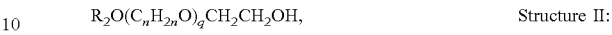

$$R_2O(C_nH_{2n}O)_qCH_2CH_2OH,\qquad \text{Structure II:}$$

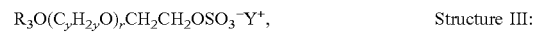

$$R_3O(C_yH_{2y}O)_rCH_2CH_2OSO_3^-Y^+,\qquad \text{Structure III:}$$

wherein x, n, and y are each independently from about 2 to about 4; wherein p, q, and r are each independently from about 1 to about 40; wherein $R_1$, $R_2$, and $R_3$ are each independently a straight-chain or branched ($C_4$-$C_{20}$)alkyl or alkylphenol; and wherein $X^+$ and $Y^+$ are each independently hydrogen or a cation. The conduit 102 can comprise casing, the first fluid 103 can be an OBM, and the second fluid 105 can be a cementitious fluid.

Various benefits may be realized by utilization of the presently disclosed methods and compositions. By incorporating the surfactant package into the wellbore servicing fluid as disclosed herein, the wellbore servicing fluid has an equal to or greater than 95% mud removal percentage, is compatible with an OBM and a cementitious fluid, and has reduced environmental impacts. The surfactant package can be added into the wellbore servicing fluid as a single component, which can save storage space and preparation time of the wellbore servicing fluid, thus the surfactant package can be used at a location having limited equipment/tools/space (e.g., an offshore platform). The surfactant package is a homogeneous fluid, which facilitates storage and transportation, and saves preparation time of the wellbore servicing fluid.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner. In particular, reference is made in the examples to "spacer fluid" compositions, and it should be understood that such spacer fluid compositions may be used for other wellbore servicing purposes.

Example 1

The effectiveness of a surfactant package of the type disclosed herein on mud removal percentage was investigated. Specifically, three spacer fluid samples were prepared with 2 gal/bbl of different surfactant packages in water. Two commercially available surfactant packages, designated as surfactant package 1 and surfactant package 2 were used as a comparison to a surfactant package of the type disclosed herein, designated as surfactant package 3. Well cleaning tests were performed using the three spacer fluid samples and eleven OBMs (OBM1 to OBM11 in Table 1) having different compositions with four commercially available base oils. In each test, a clean sleeve (e.g., a shot blasted sleeve with stopper) was immersed in an OBM and rotated at 100 rpm for about 15 minutes in order to coat the sleeve, excess mud is drained off and then soaked in a spacer fluid sample and rotated at 300 rpm for about 10 minutes, and then dried at about 100° C. for about 5 minutes in an oven.

FIGS. 3A and 3B, FIG. 3C, and FIG. 3D show photos of the clean sleeve, the OBM2-coated sleeve with the spacer fluid with Surfactant package 3 before mud removal, and the oven dried sleeve with the spacer fluid with Surfactant package 3 after OBM2 removal, respectively. The weights of the clean sleeve (W1), the OBM-coated sleeve (W2), and the oven dried sleeve (W3) were measured. Mud removal percentages were calculated according to equation (1):

$$\text{Mud removal percentage} = (W3 - W1)/(W2 - W1) \quad (1)$$

TABLE 1 lists the mud removal percentages from the well cleaning tests.
Mud removal percentage *100 of the well cleaning tests

| OBM | Surfactant package 1 | Surfactant package 2 | Surfactant package 3 |
|---|---|---|---|
| OBM1 | 84 | 99 | 99 |
| OBM2 | 70 | 86 | 100 |
| OBM3 | 86 | 97 | 100 |
| OBM4 | 94 | 97 | 100 |
| OBM5 | 82 | 91 | 100 |
| OBM6 | 94 | 69 | 100 |
| OBM7 | 72 | 87 | 100 |
| OBM8 | 96 | 83 | 100 |
| OBM9 | 96 | 75 | 100 |
| OBM10 | 87 | 100 | 100 |
| OBM11 | 96 | 99 | 100 |

Figure 4:
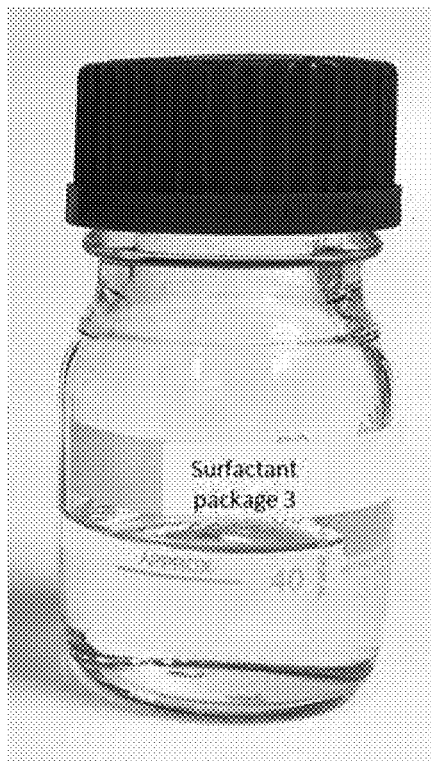
FIG. 4 is a photo of the surfactant package in accordance with some embodiments of the disclosure.

The mud removal percentages with a surfactant package of the type disclosed herein (i.e., Surfactant package 3) were equal to or greater than 99% for all the tested OBMs. In comparison, surfactant package 1 had mud removal percentages ranging from 70% to 96% while surfactant package 2 had mud removal percentages ranging from 69% to 100%. The results indicate the ability of a surfactant package of the type disclosed herein to remove equal to or greater than 99% of a wide range of OBMs. FIG. 4 shows a photo of Surfactant package 3.

Example 2

A sample of the spacer fluid of this disclosure was prepared. Compatibility of the spacer fluid with an OBM, and compatibility of the spacer fluid with a cementitious fluid were tested, respectively, in accordance with test standard API-RP-10B-2. The specific gravity and densities of the spacer fluid, the OBM, and the cementitious fluid are listed in Table 3.

TABLE 3

Specific gravity and densities

|  | OBM | Spacer fluid | Cementitious fluid |
|---|---|---|---|
| SG | 1.85 | 1.89 | 1.92 |
| Density (lbm/gal) | 15.44 | 15.77 | 16.02 |

Figure 5:
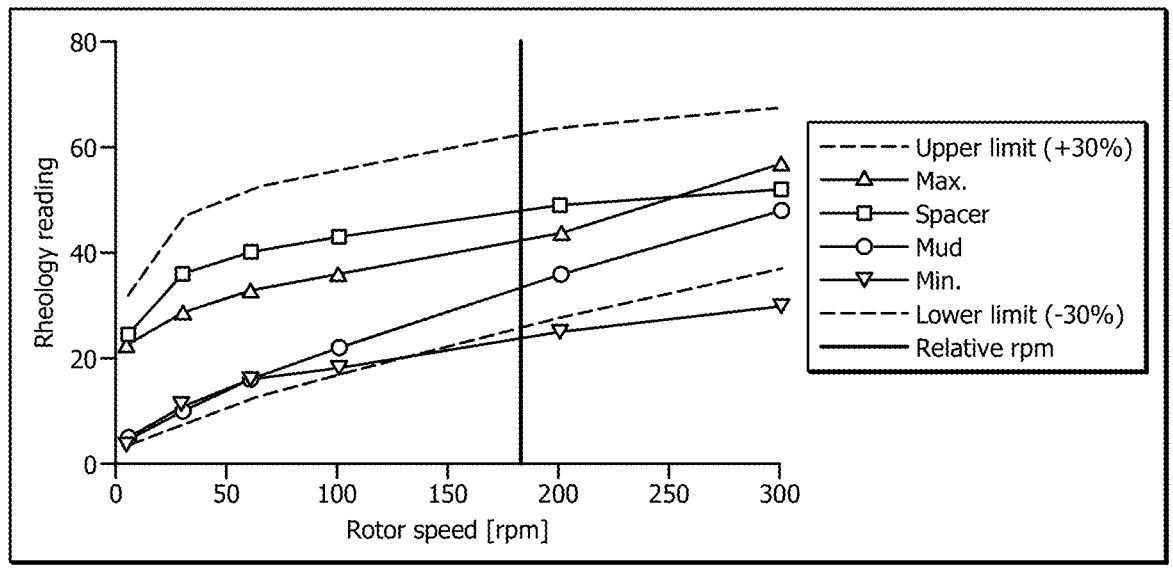
FIG. 5 is a graph of the rheology readings of OBM-spacer mixtures of a spacer fluid sample and an OBM with various amounts of the spacer fluid in accordance with some embodiments of the disclosure.

OBM-spacer mixtures of the spacer fluid and the OBM with various spacer fluid amounts of from 0 vol. % to 100 vol. % were prepared. Rheology of the OBM-spacer mixtures, the spacer fluid, and the OBM was measured by a FANN-35 rheometer at 176° F. and atmospheric pressure in accordance with test standard API-RP-10B-2. FIG. 5 shows the rheology readings from 3 rpm to 300 rpm. Referring to FIG. 5, the "Max" and "Min" curves show the maximum and minimum readings of the OBM-spacer mixtures at each rpm. The "Upper limit (+30%)" curve shows the rheology that is 30% greater than the larger one of the rheology readings of the OBM and the spacer fluid at the same rpm. The "Lower limit (−30%)" curve shows the rheology that is 30% less than the smaller one of the rheology readings of the OBM and the spacer fluid at the same rpm. The "Relative rpm" line is the equivalent shear rate experienced by various ratios of the OBM-spacer mixtures at a specific pump rate to which a spacer fluid is pumped. The "Max" and "Min" curves are generally between the "Upper limit (+30%)" curve and the "Lower limit (−30%)" curve, except the "Min" curve between 200 rpm and 300 rpm. Therefore, the rheology of the OBM-spacer mixtures was generally within a tolerance range of about ±30%, compared to the OBM and the spacer fluid. The spacer fluid was compatible with the OBM.

Figure 6:
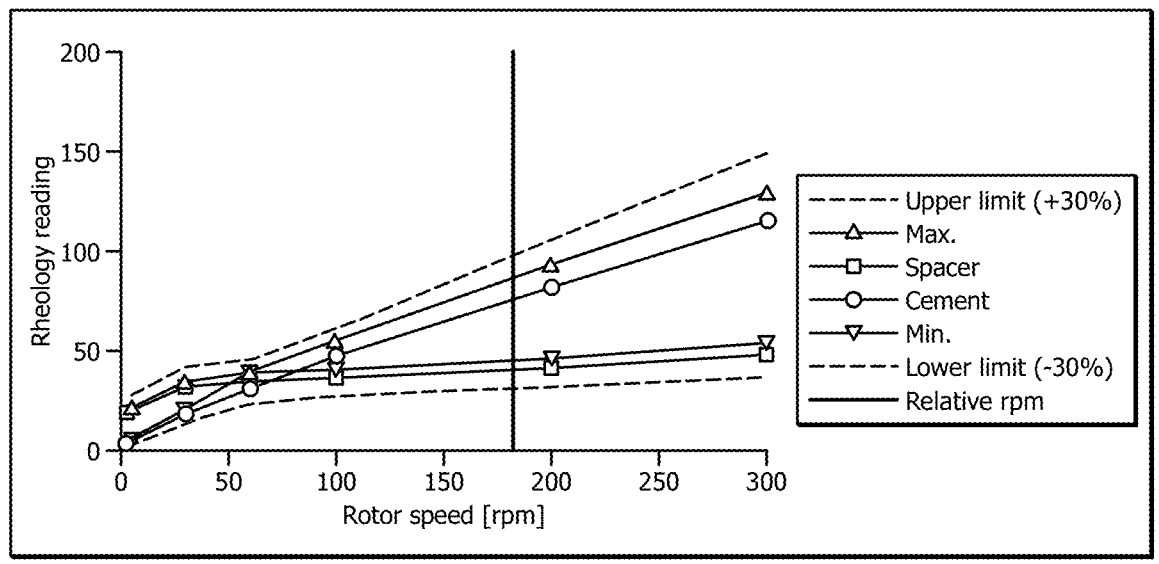
FIG. 6 is a graph of the rheology readings of cement-spacer mixtures of a spacer fluid sample and a cementitious fluid with various amounts of the spacer fluid in accordance with some embodiments of the disclosure.

Cement-spacer mixtures of the spacer fluid and the cementitious fluid with various spacer fluid amounts of from 0 vol. % to 100 vol. % were prepared. Rheology of the cement-spacer mixtures, the spacer fluid, and the cementitious fluid was measured by a FANN-35 rheometer at 176° F. and atmospheric pressure in accordance with test standard API-RP-10B-2. FIG. 6 shows the rheology readings from 3 rpm to 300 rpm. Referring to FIG. 6, the "Max" and "Min" curves show the maximum and minimum readings of the cement-spacer mixtures at each rpm. The "Upper limit (+30%)" curve shows the rheology that is 30% greater than the larger one of the rheology readings of the cementitious fluid and the spacer fluid at the same rpm. The "Lower limit (−30%)" curve shows the rheology that is 30% less than the smaller one of the rheology readings of the cementitious fluid and the spacer fluid at the same rpm. The "Relative rpm" line is the equivalent shear rate experienced by various ratios of the cement-spacer mixtures at a specific pump rate to which a spacer fluid is pumped. The "Max" and "Min" curves are generally between the "Upper limit (+30%)" curve and the "Lower limit (−30%)" curve. Therefore, the rheology of the cement-spacer mixtures was generally within a tolerance range of about ±30%, compared to the cementitious fluid and the spacer fluid. The spacer fluid was compatible with the cementitious fluid.

Example 3

Two spacer fluid samples with and without the surfactant package disclosed herein were prepared. The spacer fluid samples were each mixed with a cementitious fluid to form cement-spacer mixtures at volume mixing ratios (cementitious fluid: spacer fluid) of 90:10, 80:20 and 70:30. Thickening time to 50 Bc, time to reach 500 psi sonic strength, 24-hour sonic strength, and 24-hour crush compressive strength were measured in accordance with test standard API-RP-10B-2 for the cement-spacer mixtures and the cementitious fluid, and the results are shown in FIGS. 7-10.

Figure 7:
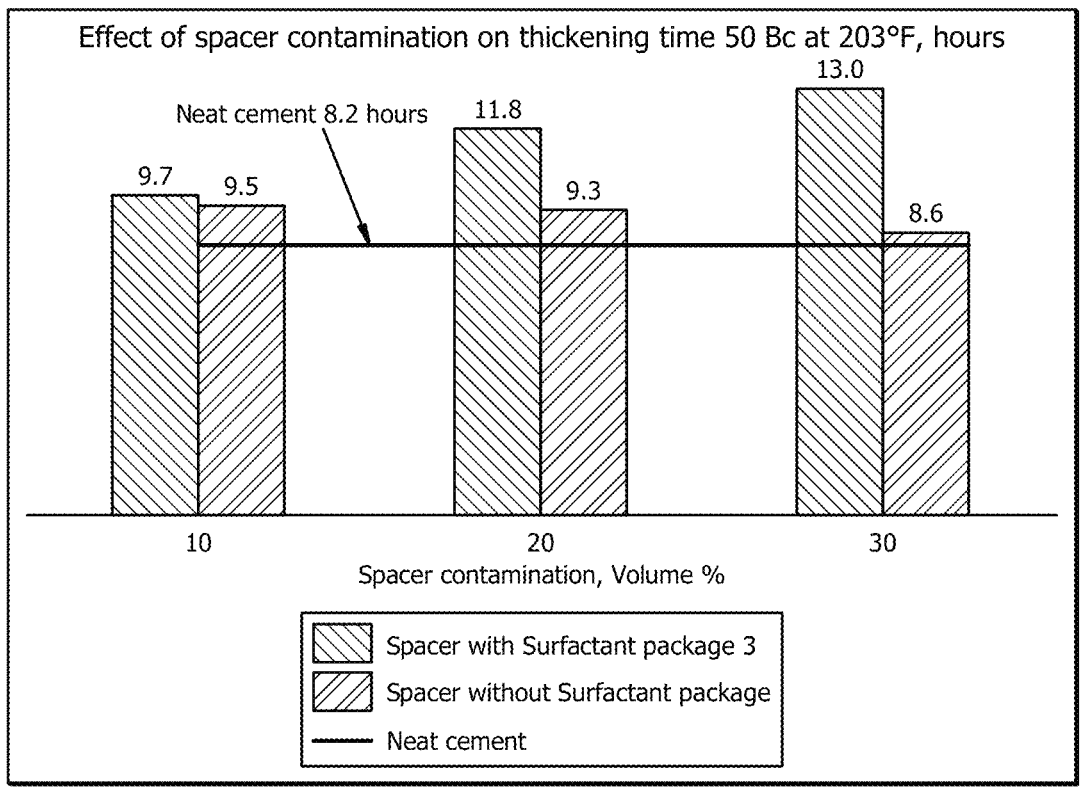
FIG. 7 is a graph of thickening time to 50 Bc of cement-spacer mixtures in accordance with some embodiments of the disclosure.

FIG. 7 shows a comparison of the thickening time to 50 Bc at 203° F. The "Neat cement" line represents the thickening time of the cementitious fluid without the spacer fluid. The thickening time of the cement-spacer mixtures with the disclosed surfactant package were in a range of from about 115% to about 160% of the thickening time of the cementitious fluid.

Figure 8:
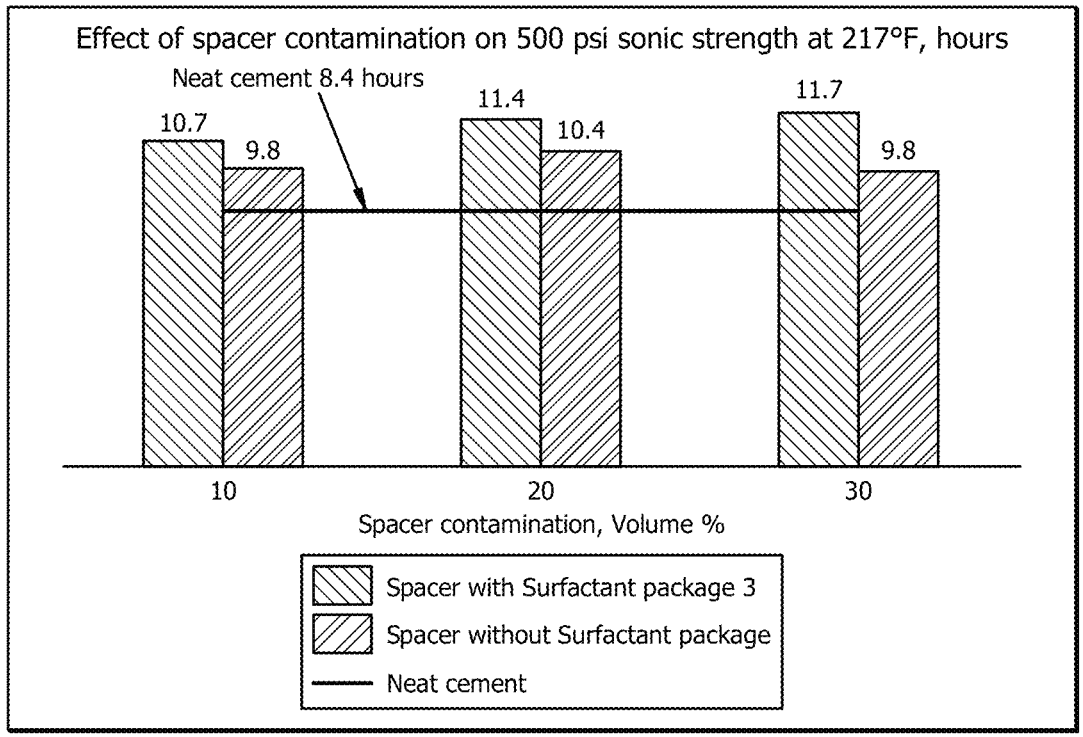
FIG. 8 is a graph of time to reach 500 psi sonic strength of cement-spacer mixtures in accordance with some embodiments of the disclosure.

FIG. 8 shows a comparison of the time to reach 500 psi sonic strength (also referred to as "time to reach 500 psi") at 217° F. The "Neat cement" line represents the time to reach 500 psi of the cementitious fluid without the spacer fluid. The time to reach 500 psi of the cement-spacer mixtures with the disclosed surfactant package were in a range of from about 125% to about 140% of the time to reach 500 psi of the cementitious fluid.

Figure 9:
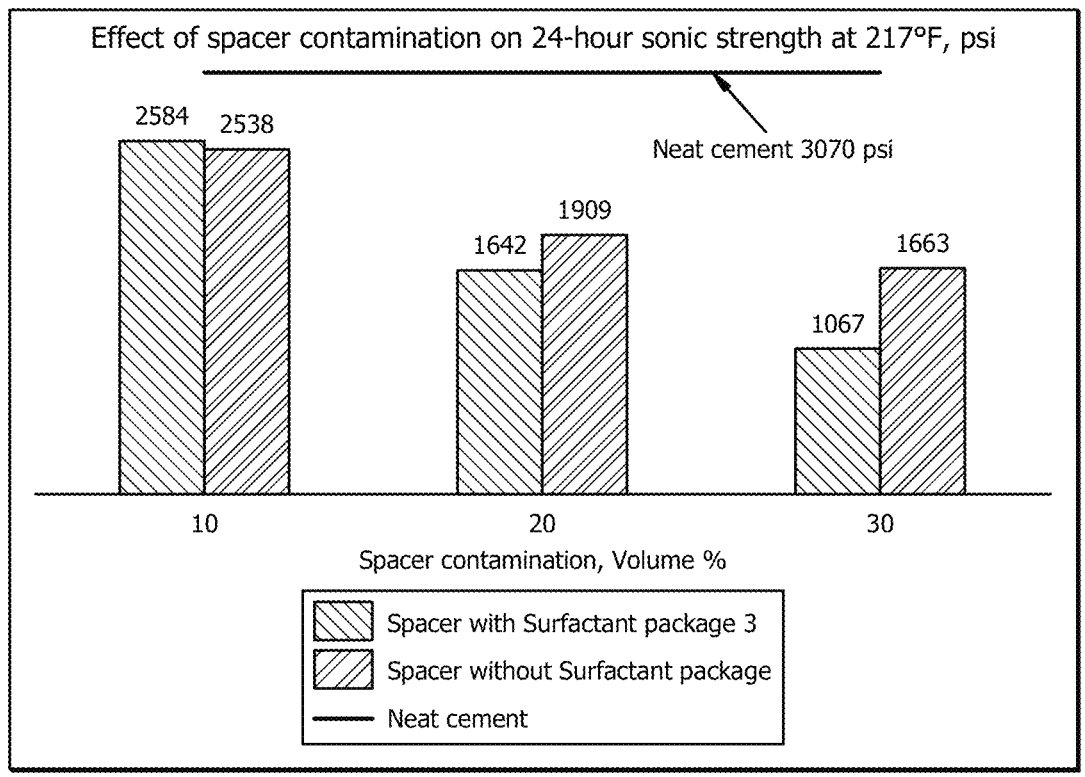
FIG. 9 is a graph of 24-hour sonic strength of cement-spacer mixtures in accordance with some embodiments of the disclosure.

FIG. 9 shows a comparison of the 24-hour sonic strength at 217° F. The "Neat cement" line represents the 24-hour sonic strength of the cementitious fluid without the spacer fluid. The 24-hour sonic strength of the cement-spacer mixtures with the disclosed surfactant package were in a range of from about 35% to about 85% of the 24-hour sonic strength of the cementitious fluid.

Figure 10:
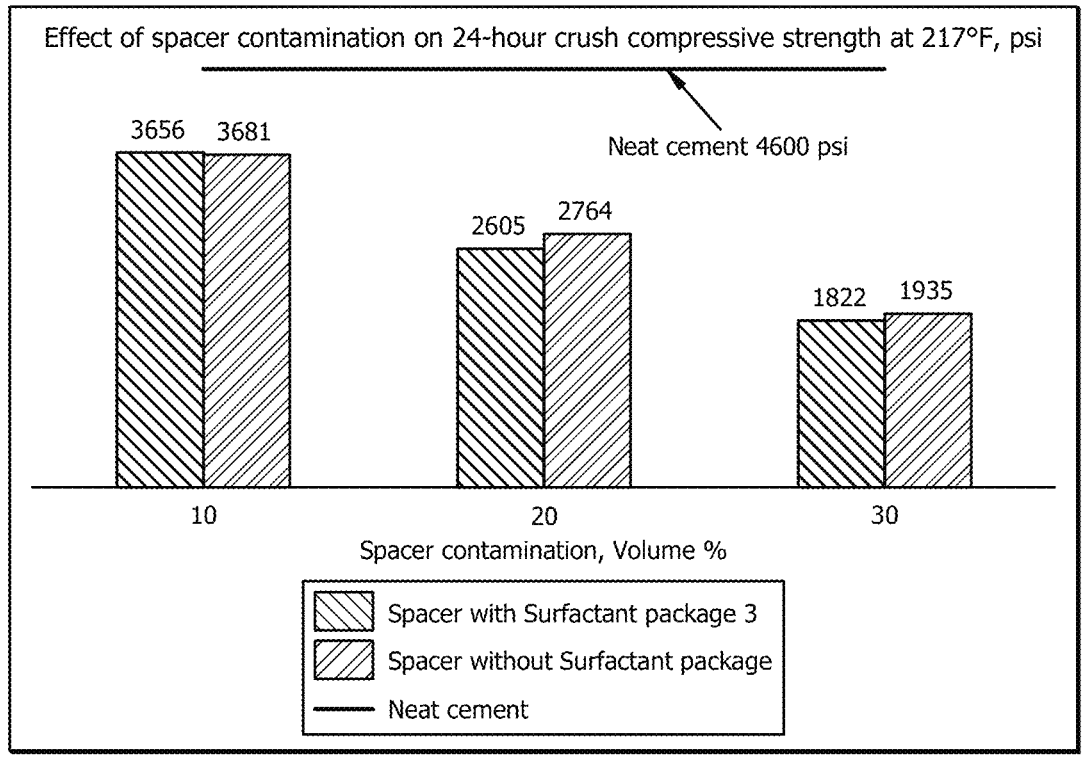
FIG. 10 is a graph of 24-hour crush compressive strength of cement-spacer mixtures in accordance with some embodiments of the disclosure.

FIG. 10 shows a comparison of the 24-hour crush compressive strength at 217° F. The "Neat cement" line represents the 24-hour crush compressive strength of the cementitious fluid without the spacer fluid. The 24-hour crush compressive strength of the cement-spacer mixtures with the disclosed surfactant package were in a range of from about 40% to about 80% of the 24-hour crush compressive strength of the cementitious fluid.

Additional Disclosure

The following is provided as additional disclosure for combinations of features and embodiments of the present disclosure.

A first embodiment, which is a surfactant package comprising: a base oil, a mutual solvent, and a surfactant, wherein the surfactant is selected from the group consisting of alcohol ethoxylates, fatty alcohol ethoxylates, alkylphenol ethoxylates, nonoxynols, fatty acid esters of sorbitol, alkyl ether carboxylic acids, ethoxysulfates, and combinations thereof.

A second embodiment, which is the surfactant package of the first embodiment, wherein the surfactant is selected from the group consisting of a first surfactant generally characterized by Structure I, a second surfactant generally characterized by Structure II, a third surfactant generally characterized by Structure III, and a combination thereof:

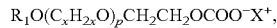    Structure I:

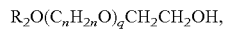    Structure II:

    Structure III:

wherein x of Structure I, n of Structure II, and y of Structure III are each independently from about 2 to about 4; wherein p of Structure I, q of Structure II, and r of Structure III are each independently from about 1 to about 40; wherein $R_1$, $R_2$, and $R_3$ are each independently a straight-chain or branched ($C_4$-$C_{20}$)alkyl or alkylphenol; and wherein $X^+$ of Structure I and $Y^+$ of Structure III are each independently hydrogen or a cation.

A third embodiment, which is the surfactant package of the second embodiment, wherein the first surfactant comprises a carboxylic acid functional group, a monoisopropanolamine salt, an amine salt, a sodium salt, an ammonium salt, a potassium salt, or a combination thereof.

A fourth embodiment, which is the surfactant package of any of the second through the third embodiments, wherein the first surfactant comprises a monoisopropanolamine salt, wherein $X^+$ comprises:

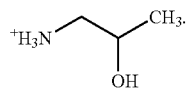

A fifth embodiment, which is the surfactant package of any of the second through the fourth embodiments, wherein the third surfactant comprises a sulphate functional group, a monoisopropanolamine salt, an amine salt, a sodium salt, an ammonium salt, a potassium salt, or a combination thereof.

A sixth embodiment, which is the surfactant package of any of the second through the fifth embodiments, wherein the third surfactant comprises a monoisopropanolamine salt, wherein $Y^+$ comprises:

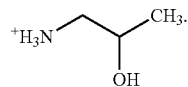

A seventh embodiment, which is the surfactant package of any of the second through the sixth embodiments, wherein x of Structure I, n of Structure II, and y of Structure III are 2, wherein p of Structure I, q of Structure II, and r of Structure III are each independently from about 2 to about 10, and wherein $R_1$, $R_2$ and $R_3$ are each independently a straight-chain ($C_6$-$C_{12}$)alkyl.

An eighth embodiment, which is the surfactant package of any of the first through the seventh embodiments, wherein the surfactant is present in the surfactant package in an amount of from about 1 vol. % to about 99 vol. %, based on the total volume of the surfactant package.

A ninth embodiment, which is the surfactant package of any of the first through the eighth embodiments, wherein the base oil comprises alkanes, hydrocarbons, olefins, polyolefins or isomerized polyolefins, glycerides of fatty acids, aliphatic esters, aliphatic ethers, aliphatic acetals, alkynes, aromatics, tall oil, crude oil, light cycle oil, synthetic ester oil, diesel, cycloalkane, petroleum distillate, liquefied petroleum gas, kerosene, gas oil, fuel oil, paraffin oil, synthetic paraffin oil, mineral oil, refined oil, low-toxicity mineral oil, ester, amide, synthetic oil, polydiorganosiloxane, siloxane, organosiloxane, ether, dialkylcarbonate, vegetable oil, biodiesel, renewable diesel, or combinations thereof.

A tenth embodiment, which is the surfactant package of any of the first through the ninth embodiments, wherein the base oil comprises alkanes.

An eleventh embodiment, which is the surfactant package of any of the first through the tenth embodiments, wherein the base oil comprises $C_{10}$-$C_{20}$ linear alkanes.

A twelfth embodiment, which is the surfactant package of any of the first through the eleventh embodiments, wherein the base oil is present in the surfactant package in an amount of from about 1 vol. % to about 99 vol. %, based on a total volume of the surfactant package.

A thirteenth embodiment, which is the surfactant package of any of the first through the twelfth embodiments, wherein the mutual solvent comprises a polar solvent.

A fourteenth embodiment, which is the surfactant package of any of the first through the thirteenth embodiments, wherein the mutual solvent comprises monethylene glycol, diethylene glycol, ethylene glycol monobutyl ether, diethylene glycol monobutyl ether, polyethylene glycol butyl ether, glycol-ethers, propylene glycol, glycols, hexanol, 1,2-propane diol, diols, glycerol, glycerine, triols, polyols, straight-chain or branched $C_3$-$C_{12}$ alcohols, N-methyl-2-pyrrolidone, dimethylsulfoxide, dimethylformamide, tetrahydrofuran, acetone, $C_3$-$C_{10}$ ketone, $C_2$-$C_{10}$ ester, $C_2$-$C_{10}$ ether, $C_3$-$C_{10}$ cyclic ether, or combinations thereof.

A fifteenth embodiment, which is the surfactant package of any of the first through the fourteenth embodiments, wherein the mutual solvent comprises ethylene glycol monobutyl ether, hexanol, or a combination thereof.

A sixteenth embodiment, which is the surfactant package of any of the first through the fifteenth embodiments, wherein the mutual solvent is present in the surfactant package in an amount of from about 1 vol. % to about 99 vol. %, based on a total volume of the surfactant package.

A seventeenth embodiment, which is the surfactant package of any of the first through the sixteenth embodiments, having a mud removal percentage of equal to or greater than 95% in a well cleaning test with an oil-based mud (OBM), wherein the surfactant package is in an amount of from about 0.05 gallon per barrel (gal/bbl) to about 10 gal/bbl in water.

An eighteenth embodiment, which is the surfactant package of any of the first through the seventeenth embodiments, wherein the surfactant package is North Sea compliant.

A nineteenth embodiment, which is the surfactant package of any of the first through the eighteenth embodiments, wherein the surfactant package is a homogeneous fluid.

A twentieth embodiment, which is the surfactant package of any of the first through the nineteenth embodiments, having a density of from about 4 lb/gal (ppg) to about 25 ppg.

A twenty-first embodiment, which is a wellbore servicing fluid comprising the surfactant package of any of the first through the twentieth embodiments and an aqueous fluid, wherein the surfactant package is present in the wellbore servicing fluid in an amount of from about 0.1 vol. % to about 25 vol. %, based on the total volume of the wellbore servicing fluid.

A twenty-second embodiment, which is a wellbore servicing fluid comprising a base oil, a mutual solvent, a surfactant, and an aqueous fluid, wherein the surfactant is selected from the group consisting of a first surfactant generally characterized by Structure I, a second surfactant generally characterized by Structure II, a third surfactant generally characterized by Structure III, and a combination thereof:

$$R_1O(C_xH_{2x}O)_pCH_2CH_2OCOO^-X^+, \quad \text{Structure I:}$$

$$R_2O(C_nH_{2n}O)_qCH_2CH_2OH, \quad \text{Structure II:}$$

$$R_3O(C_yH_{2y}O)_rCH_2CH_2OSO_3^-Y^+, \quad \text{Structure III:}$$

wherein x of Structure I, n of Structure II, and y of Structure III are each independently from about 2 to about 4; wherein p of Structure I, q of Structure II, and r of Structure III are each independently from about 1 to about 40; wherein $R_1$, $R_2$, and $R_3$ are each independently a straight-chain or branched ($C_4$-$C_{20}$)alkyl or alkylphenol; and wherein $X^+$ of Structure I and $Y^+$ of Structure III are each independently hydrogen or a cation.

A twenty-third embodiment, which is the wellbore servicing fluid of the twenty-second embodiment, wherein the base oil is in an amount of from about 0.1 vol. % to about 99 vol. %, the mutual solvent is in an amount of from about 0.1 vol. % to about 99 vol. %, and the surfactant is in an amount of from about 0.1 vol. % to about 99 vol. %, based on the total volume of the wellbore servicing fluid.

A twenty-fourth embodiment, which is the wellbore servicing fluid of any of the twenty-first through the twenty-third embodiments, wherein the wellbore servicing fluid is compatible with an OBM when measured in accordance with test standard API-RP-10B-2.

A twenty-fifth embodiment, which is the wellbore servicing fluid of any of the twenty-first through the twenty-fourth embodiments, wherein the wellbore servicing fluid is compatible with a cementitious fluid when measured in accordance with test standard API-RP-10B-2.

A twenty-sixth embodiment, which is an OBM-spacer mixture of an OBM and the wellbore servicing fluid of any of the twenty-first through the twenty-fifth embodiments, wherein the OBM-spacer mixture is a water-external phase emulsion in a spacer surfactant screening test (SSST) in accordance with test standard API-RP-10B-2, and wherein the wellbore servicing fluid is in an amount of from about 10 vol. % to about 99 vol. %, based on the total volume of the OBM-spacer mixture.

A twenty-seventh embodiment, which is a cement-spacer mixture of a cementitious fluid and the wellbore servicing fluid of any of the twenty-first through the twenty-sixth embodiments, at from about 150° F. to about 250° F., having a thickening time to about 50 Bearden units of Consistency (Bc) of about 60% to about 200% of the thickening time to about 50 Bc of the cementitious fluid, wherein the wellbore servicing fluid is present in the cement-spacer mixture in an amount of equal to or less than about 30 vol. % based on the total volume of the cement-spacer mixture.

A twenty-eighth embodiment, which is a cement-spacer mixture of a cementitious fluid and the wellbore servicing fluid of any of the twenty-first through the twenty-seventh embodiments, at from about 150° F. to about 280° F., having a time to reach 500 psi sonic strength of about 60% to about 200% of the time to reach 500 psi sonic strength of the cementitious fluid, wherein the wellbore servicing fluid is present in the cement-spacer mixture in an amount of equal to or less than about 30 vol. % based on the total volume of the cement-spacer mixture.

A twenty-ninth embodiment, which is a method of preparing the surfactant package of any of the first through the twentieth embodiments, comprising: mixing components of the surfactant package using mixing equipment to form a fluid.

A thirtieth embodiment, which is a method of preparing the wellbore servicing fluid of any of the twenty-first through the twenty-eighth embodiments, comprising: mixing components of the wellbore servicing fluid using mixing equipment to form a pumpable fluid.

A thirty-first embodiment, which is a method of servicing a wellbore penetrating a subterranean formation, comprising: placing a wellbore servicing fluid into the wellbore, wherein the wellbore servicing fluid comprises an aqueous fluid and the surfactant package of any of the first through the twentieth embodiments.

A thirty-second embodiment, which is the method of the thirty-first embodiment, wherein the surfactant package is present in the wellbore servicing fluid in an amount of from about 0.1 vol. % to about 25 vol. %, based on the total volume of the wellbore servicing fluid.

A thirty-third embodiment, which is the method of the thirty-first or the thirty-second embodiment, wherein there is a conduit inside the wellbore and wherein the method further comprises: placing the wellbore servicing fluid down through the conduit and back up through an annular space between an outside wall of the conduit and a wall of the wellbore, or placing the wellbore servicing fluid down through an annular space between an outside wall of the conduit and a wall of the wellbore and back up through the conduit.

A thirty-fourth embodiment, which is the method of any of the thirty-first through the thirty-third embodiments, wherein the wellbore servicing fluid is a spacer fluid.

A thirty-fifth embodiment, which is a method of servicing a wellbore with casing disposed therein to form an annular space between the wellbore wall and an outer surface of the casing, wherein a first fluid is present in at least a portion of the annular space, comprising: placing a spacer fluid into at least a portion of the annular space and displacing at least a portion of the first fluid from the annular space, wherein the spacer fluid comprises an aqueous fluid and the surfactant package of any of the first through the twentieth embodiments, and placing a cementitious fluid into at least a portion of the annular space and displacing at least a portion of the spacer fluid from the annular space.

A thirty-sixth embodiment, which is the method of the thirty-fifth embodiment, wherein the first fluid is a drilling fluid.

A thirty-seventh embodiment, which is the method of the thirty-fifth or the thirty-sixth embodiment, wherein the first fluid is an OBM.

A thirty-eighth embodiment, which is the method of the thirty-seventh embodiment, further comprising removing at least a portion of the OBM from surfaces of the annular space.

A thirty-ninth embodiment, which is the method of any of the thirty-fifth through the thirty-eighth embodiments, further comprising allowing at least a portion of the cementitious fluid to set.

A fortieth embodiment, which is a method of servicing a wellbore penetrating a subterranean formation, wherein the wellbore has a conduit disposed therein forming an annular space between an outer wall of the conduit and an inner wall of the wellbore, comprising: pumping a first fluid followed by a spacer fluid followed by a second fluid from the surface down an inner flow bore of the conduit, out an end of the conduit, and back up the annular space toward the surface, wherein the spacer fluid comprises an aqueous fluid and a surfactant package, wherein the surfactant package comprises a base oil, a mutual solvent, and a surfactant selected from the group consisting of a first surfactant generally characterized by Structure I, a second surfactant generally characterized by Structure II, a third surfactant generally characterized by Structure III, and a combination thereof:

$$R_1O(C_xH_{2x}O)_pCH_2CH_2OCOO^-X^+, \quad \text{Structure I:}$$

$$R_2O(C_nH_{2n}O)_qCH_2CH_2OH, \quad \text{Structure II:}$$

$$R_3O(C_yH_{2y}O)_rCH_2CH_2OSO_3^-Y^+, \quad \text{Structure III:}$$

wherein x, n, and y are each independently from about 2 to about 4; wherein p, q, and r are each independently from about 1 to about 40; wherein $R_1$, $R_2$, and $R_3$ are each independently a straight-chain or branched ($C_4$-$C_{20}$)alkyl or alkylphenol; and wherein $X^+$ and $Y^+$ are each independently hydrogen or a cation.

A forty-first embodiment, which is a method of servicing a wellbore penetrating a subterranean formation, wherein the wellbore has a conduit disposed therein forming an inner flow bore of the conduit and an annular space between an outer wall of the conduit and an inner wall of the wellbore, comprising pumping a first fluid followed by a spacer fluid followed by a second fluid from the surface down through the annular space, out an end of the annular space, and back up the inner flow bore toward the surface, wherein the spacer fluid comprises an aqueous fluid and a surfactant package, wherein the surfactant package comprises a base oil, a mutual solvent, and a surfactant selected from the group consisting of a first surfactant generally characterized by Structure I, a second surfactant generally characterized by Structure II, a third surfactant generally characterized by Structure III, and a combination thereof:

$$R_1O(C_xH_{2x}O)_pCH_2CH_2OCOO^-X^+, \quad \text{Structure I:}$$

$$R_2O(C_nH_{2n}O)_qCH_2CH_2OH, \quad \text{Structure II:}$$

$$R_3O(C_yH_{2y}O)_rCH_2CH_2OSO_3^-Y^+, \quad \text{Structure III:}$$

wherein x, n, and y are each independently from about 2 to about 4; wherein p, q, and r are each independently from about 1 to about 40; wherein $R_1$, $R_2$, and $R_3$ are each independently a straight-chain or branched ($C_4$-$C_{20}$)alkyl or alkylphenol; and wherein $X^+$ and $Y^+$ are each independently hydrogen or a cation.

A forty-second embodiment, which is the method of the fortieth or the forty-first embodiment, wherein the conduit comprises casing, the first fluid is an OBM, and the second fluid is a cementitious fluid.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A wellbore servicing fluid comprising a surfactant package, and an aqueous fluid,
   wherein the surfactant package is a homogenous fluid comprising a base oil, a mutual solvent, and a surfactant, wherein the surfactant is selected from the group consisting of a surfactant generally characterized by Structure I, a surfactant generally characterized by Structure II, a surfactant generally characterized by Structure III, and a combination thereof:

$$R_1O(C_xH_{2x}O)_pCH_2CH_2OCOO^-X^+,$$ Structure I:

$$R_2O(C_nH_{2n}O)_qCH_2CH_2OH,$$ Structure II:

$$R_3O(C_yH_{2y}O)_rCH_2CH_2OSO_3^-Y^+.$$ Structure III:

wherein x of Structure I, n of Structure II, and y of Structure III are each independently from about 2 to about 4; wherein p of Structure I, q of Structure II, and r of Structure III are each independently from about 1 to about 40; wherein $R_1$, $R_2$, and $R_3$ are each independently a straight-chain or branched ($C_4$-$C_{20}$)alkyl or alkylphenol; and wherein $X^+$ of Structure I and $Y^+$ of Structure III are each independently hydrogen or a cation.

2. The wellbore servicing fluid of claim 1, wherein the wellbore servicing fluid is compatible with an oil-based mud (OBM) when measured in accordance with test standard API-RP-10B-2.

3. The wellbore servicing fluid of claim 1, wherein the wellbore servicing fluid is compatible with a cementitious fluid when measured in accordance with test standard API-RP-10B-2.

4. An OBM-spacer mixture of an OBM and the wellbore servicing fluid of claim 1, wherein the OBM-spacer mixture is a water-external phase emulsion in a spacer surfactant screening test (SSST) in accordance with test standard API-RP-10B-2, and wherein the wellbore servicing fluid is in an amount of from about 10 vol. % to about 99 vol. %, based on the total volume of the OBM-spacer mixture.

5. The wellbore servicing fluid of claim 1, wherein the surfactant generally characterized by Structure I comprises a carboxylic acid functional group, a monoisopropanolamine salt, an amine salt, a sodium salt, an ammonium salt, a potassium salt, or a combination thereof.

6. The wellbore servicing fluid of claim 1, wherein the surfactant generally characterized by Structure III comprises a sulphate functional group, a monoisopropanolamine salt, an amine salt, a sodium salt, an ammonium salt, a potassium salt, or a combination thereof.

7. The wellbore servicing fluid of claim 1, wherein x of Structure I, n of Structure II, and y of Structure III are 2, wherein p of Structure I, q of Structure II, and r of Structure III are each independently from about 2 to about 10, and wherein $R_1$, $R_2$ and $R_3$ are each independently a straight-chain ($C_6$-$C_{12}$)alkyl.

8. The wellbore servicing fluid of claim 1, wherein the base oil, wherein the surfactant package is present in the wellbore servicing fluid in an amount of from about 0.1 vol. % to about 25 vol. %, based on the total volume of the wellbore servicing fluid.

9. The wellbore servicing fluid of claim 1, wherein the base oil comprises alkanes, hydrocarbons, olefins, polyolefins or isomerized polyolefins, glycerides of fatty acids, aliphatic esters, aliphatic ethers, aliphatic acetals, alkynes, aromatics, tall oil, crude oil, light cycle oil, synthetic ester oil, diesel, cycloalkane, petroleum distillate, liquefied petroleum gas, kerosene, gas oil, fuel oil, paraffin oil, synthetic paraffin oil, mineral oil, refined oil, low-toxicity mineral oil, ester, amide, synthetic oil, polydiorganosiloxane, siloxane, organosiloxane, ether, dialkylcarbonate, vegetable oil, biodiesel, renewable diesel, or combinations thereof.

10. The wellbore servicing fluid of claim 1, wherein the base oil comprises $C_{10}$-$C_{20}$ linear alkanes.

11. The wellbore servicing fluid of claim 8, wherein the base oil is present in the surfactant package in an amount of from about 1 vol. % to about 99 vol. %, based on a total volume of the surfactant package and wherein the mutual solvent is present in the surfactant package in an amount of from about 1 vol. % to about 99 vol. %, based on a total volume of the surfactant package.

12. The wellbore servicing fluid of claim 1, wherein the mutual solvent comprises a polar solvent.

13. The wellbore servicing fluid of claim 1, wherein the mutual solvent comprises monethylene glycol, diethylene glycol, ethylene glycol monobutyl ether, diethylene glycol monobutyl ether, polyethylene glycol butyl ether, glycolethers, propylene glycol, glycols, hexanol, 1,2-propane diol, diols, glycerol, glycerine, triols, polyols, straight-chain or branched $C_3$-$C_{12}$ alcohols, N-methyl-2-pyrrolidone, dimethylsulfoxide, dimethylformamide, tetrahydrofuran, acetone, $C_3$-$C_{10}$ ketone, $C_2$-$C_{10}$ ester, $C_2$-$C_{10}$ ether, $C_3$-$C_{10}$ cyclic ether, or combinations thereof.

14. The wellbore servicing fluid of claim 1, wherein the mutual solvent comprises ethylene glycol monobutyl ether, hexanol, or a combination thereof.

15. The wellbore servicing fluid of claim 8, wherein the surfactant package has a mud removal percentage of equal to or greater than 95% in a well cleaning test with an oil-based mud (OBM), wherein the surfactant package is in an amount of from about 0.05 gallon per barrel (gal/bbl) to about 10 gal/bbl in water.

16. The wellbore servicing fluid of claim 8, wherein the surfactant package is North Sea compliant.

17. The wellbore servicing fluid of claim 7, wherein the base oil comprises $C_{10}$-$C_{20}$ linear alkanes.

18. The wellbore servicing fluid of claim 17, wherein the mutual solvent comprises ethylene glycol monobutyl ether, hexanol, or a combination thereof.

19. The wellbore servicing fluid of claim 1, wherein the surfactant comprises a combination of the surfactant generally characterized by Structure I, the surfactant generally characterized by Structure II, and the surfactant generally characterized by Structure III.

20. The wellbore servicing fluid of claim 1, wherein the aqueous fluid is present in an amount from about 10 vol. % to about 99 vol. %.

* * * * *